(12) United States Patent
Kashiwase (10) Patent No.: US 7,336,179 B2
(45) Date of Patent: Feb. 26, 2008

(54) INFORMATION PROCESSING SYSTEM USING IC TAGS

(75) Inventor: Susumu Kashiwase, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 189 days.

(21) Appl. No.: 11/258,840

(22) Filed: Oct. 25, 2005

(65) Prior Publication Data

US 2006/0087434 A1    Apr. 27, 2006

(30) Foreign Application Priority Data

Oct. 26, 2004   (JP)   ............... P.2004-311292

(51) Int. Cl.
*G08B 13/14*    (2006.01)
(52) U.S. Cl. ............... 340/572.1; 340/10.1; 340/10.32; 340/572.4
(58) Field of Classification Search ............ None
See application file for complete search history.

(56) References Cited

U.S. PATENT DOCUMENTS

| | | | |
|---|---|---|---|
| 5,686,902 A * | 11/1997 | Reis et al. ............... | 340/10.2 |
| 5,936,527 A * | 8/1999 | Isaacman et al. ......... | 340/572.1 |
| 6,262,662 B1 * | 7/2001 | Back et al. ............... | 340/572.1 |
| 7,051,084 B1 * | 5/2006 | Hayton et al. ............ | 709/219 |
| 7,175,082 B2 * | 2/2007 | Hoshina .................... | 235/385 |

FOREIGN PATENT DOCUMENTS

JP       2002-353852       12/2002

\* cited by examiner

*Primary Examiner*—Benjamin C. Lee
*Assistant Examiner*—Son Tang
(74) *Attorney, Agent, or Firm*—Hogan & Hartson LLP (57) ABSTRACT

There is disclosed an information processing system having plural IC tags (e.g. RFID tags), each of which transmits back a signal in response to an interrogatory signal sent from a cell phone acting as an interrogator. The information processing system includes the RFID tags and the cell phone. The cell phone transmits an interrogatory signal to the tags to read information from the tags. Each tag receiving the interrogatory signal transmits positional information stored in the tag to the cell phone in response to the interrogatory signal. The cell phone transmits a specific interrogatory signal including at least one of the transmitted sets of positional information. Each tag receiving the specific interrogatory signal makes a decision as to whether the positional information contained in the specific interrogatory signal matches the positional information stored in the tag itself. According to the specific interrogatory signal and the result of the decision, information contained in at least one of plural storage regions is transmitted to the interrogator.

2 Claims, 11 Drawing Sheets

INFORMATION PROCESSING SYSTEM USING IC TAGS

BACKGROUND OF THE INVENTION

The present invention relates to an information processing system using IC tags.

In recent years, the arrival of a ubiquitously networked society has been increasingly anticipated and various techniques regarding the ubiquitously networked society have been proposed. Among others, RFID (Radio Frequency IDentification) technology has induced various new techniques and the development of new services from various aspects because the body of each RFID tag is minuscule and economical to fabricate. More specifically, RFID tags can be attached to various objects. In addition, it is very convenient to manage RFID-tagged objects.

One of these techniques consists of an RFID system having an interrogator and is described in JP-A-2002-353852. A bidirectional communication function is imparted to the interrogator. This makes it easy for an information processing device on a communication network, such as a cell phone, to read information on an RFID tag present in an RFID system.

In the above-described prior art technique, radio waves sent from the interrogator are modulated by the RFID tag based on information stored in the RFID tag itself. Therefore, either the interrogator or an information processing device (hereinafter referred to also as the interrogator) attempting to read information on the RFID tag via the interrogator needs to recognize the meaning of the information held in the RFID tag. For example, where plural kinds of interrogators read information from the same RFID tag, it has been impossible for each interrogator to read only the information that it requires.

SUMMARY OF THE INVENTION

The present invention has been made to solve the foregoing problem. It is an object of the invention to provide an information processing system, interrogator, and IC tag-reading method permitting an IC tag such as an RFID tag to transmit back a signal in response to an interrogatory signal sent from the interrogator.

An information processing system for achieving the object has plural IC tags and at least one interrogator. The interrogator has an interrogatory signal transmitter for transmitting an interrogatory signal to the IC tags to read information from each of the IC tags and a specific interrogatory signal transmitter. Information transmitted from the IC tags contains sets of positional information. The specific interrogatory signal transmitter transmits a specific interrogatory signal containing at least one of the sets of positional information in response to the sets of positional information. Each of the IC tags has a positional information storage for storing positional information about a position at which the IC tag is attached, a positional information transmitter for transmitting the positional information stored in the positional information storage to the interrogator in response to the interrogatory signal sent from the interrogator, and a decision section for making a decision as to whether the positional information contained in the specific interrogatory signal matches the positional information stored in the positional information storage.

DESCRIPTION OF THE PREFERRED EMBODIMENTS

Embodiments of the present invention are described with reference to the drawings.

Figure 1:
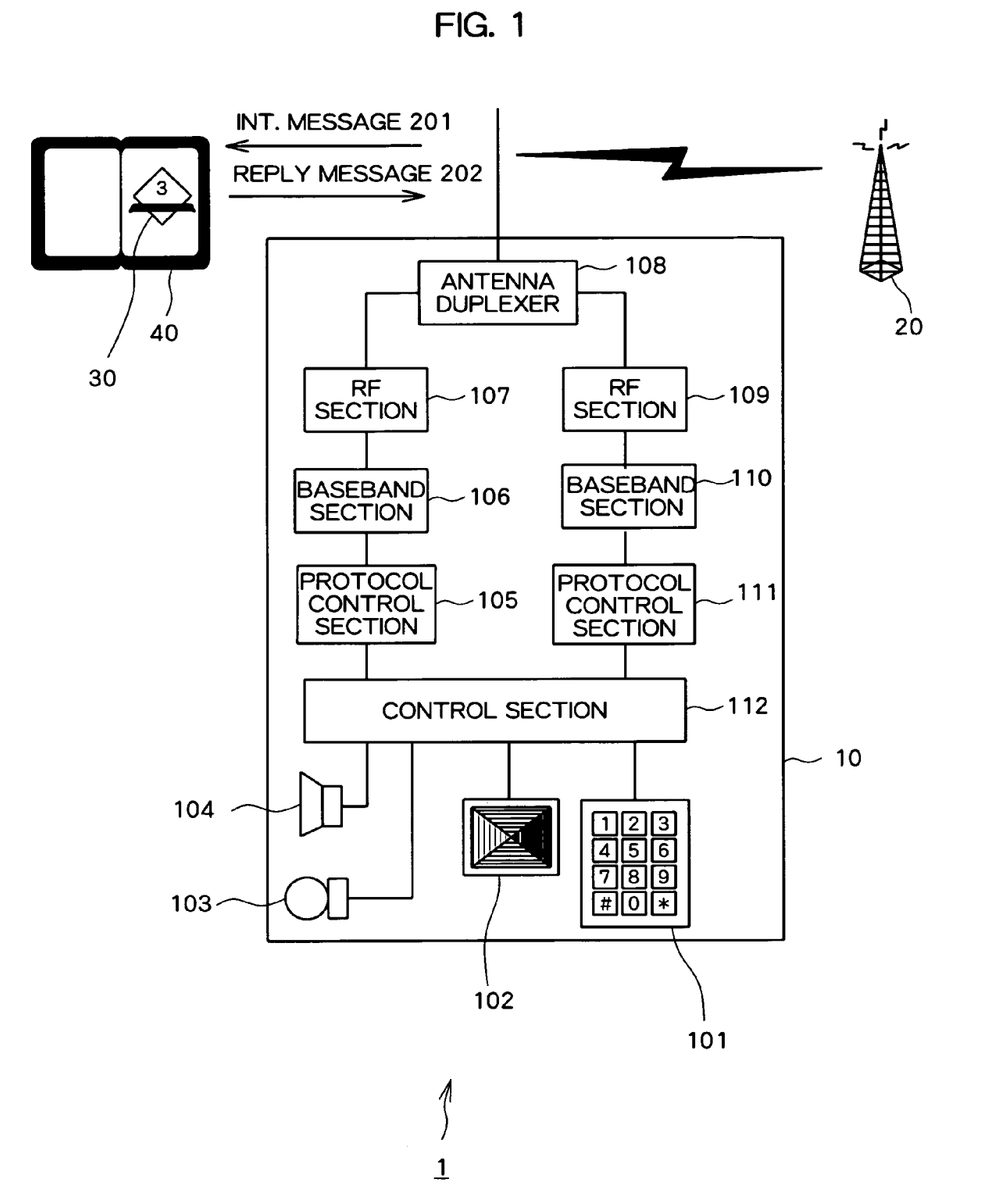
FIG. 1 is a configurational diagram of an information processing system associated with an embodiment of the present invention.

Referring to FIG. 1, an information processing system associated with an embodiment of the present invention is generally indicated by numeral 1 and designed including a cell phone 10, a base station 20, and an RFID tag 30 within a mobile communication system. The RFID tag 30 is attached to a book 40.

Referring still to FIG. 1, the cell phone 10 is designed to include a keypad 101, an LCD panel display 102, a microphone 103, a speaker 104, protocol control sections 105, 111, baseband sections 106, 110, RF sections 107, 109, an antenna duplexer 108, and a control section 112. The keypad 101, LCD panel display 102, microphone 103, and speaker 104 are equipped as man-machine interface devices in the cell phone 10. The keypad 101 consists of at least keys on a push button phone, i.e., keys including numerals from 0 to 9, #, and *. The cell phone 10 accepts a key entry made by the user of the phone 10 who depresses the keys of the keypad 101. A signal in response to each key is entered into the control section 112. The LCD panel display 102 is a display device and displays the results of various kinds of processing in the cell phone 10 performed according to an instruction from the control section 112. The user can know the state of the cell phone 10 by checking the provided display. The microphone 103 also functions as a transmitter and accepts speech input. The control section 112 performs predetermined processing in response to the speech input. The speaker 104 also acts as a receiver and outputs speech according to an instruction from the control section 112.

The protocol control section 105, baseband section 106, and RF section 107 function as a transmission block used when a signal is sent from the cell phone 10. In particular, a signal assembled by the control section 112 (e.g., an interrogatory message 201-1 described later) is converted into a digital signal based on a predetermined protocol in the protocol control section 105. Where the communicating party is the RFID tag 30, for example, the protocol is a protocol used in the RFID system. Where the communicating party is the base station 20, the protocol is a protocol used in the mobile communication system and in a network to which a signal is sent.

The baseband section 106 modulates the carrier wave using a protocol-converted digital signal to obtain a baseband signal. Here, the baseband section 106 further determines the time slot in time-division multiplexing, the frequency in frequency-division multiplexing, and PN codes in code-division multiplexing, for example, and performs multiplexing. The RF section 107 frequency-converts the baseband signal to obtain a signal in a RF band and outputs it to the antenna duplexer 108. The duplexer 108 outputs the entered signal from the antenna. In the present description, it is assumed that the cell phone 10 acting as a component of the RFID system and the cell phone 10 acting as a component of the mobile communication system use the same transmission block. Alternatively, different transmission blocks may also be equipped. Where the RFID system and the mobile communication system use different RF frequency bands, different sets of antennas and antenna duplexers 108 may be prepared respectively for the two different systems.

The RF section 109, baseband section 110, and protocol control section 111 function as a reception block used when a signal sent to the cell phone 10 is received. In particular, the signal arriving at the antenna is inputted into the RF section 109 via the antenna duplexer 108. At this time, in a case where signals have been multiplexed, for example, by time-division multiplexing, the antenna duplexer 108 is permitted to transmit a signal by connecting the antenna and RF section 107 during the transmission time slot. The duplexer is also permitted to receive a signal by connecting the antenna and RF section 109 during the reception time slot.

The RF section 109 frequency-converts the signal inputted by the antenna duplexer 108 to obtain a baseband signal in the baseband. The baseband section 110 obtains a digital signal resulting from multiplication by the carrier wave. The protocol control section 111 outputs a signal (e.g., a reply message 202-1 as described later) obtained by a reverse protocol conversion to the control section 112. In the present description, it is assumed that the cell phone 10 acting as a component of the RFID system and the cell phone 10 acting as a component of the mobile communication system use the same reception block. Alternatively, different reception blocks may also be equipped.

As described so far, the control section 112 exchanges signals with the base station 20 and RFID tag 30. Furthermore, the cell phone 10 also acts as an interrogator in the RFID system. That is, the control section 112 transmits an interrogatory message (INT. message) 201 to the RFID tag 30 and receives a reply message 202 from the RFID tag 30.

Figure 2:
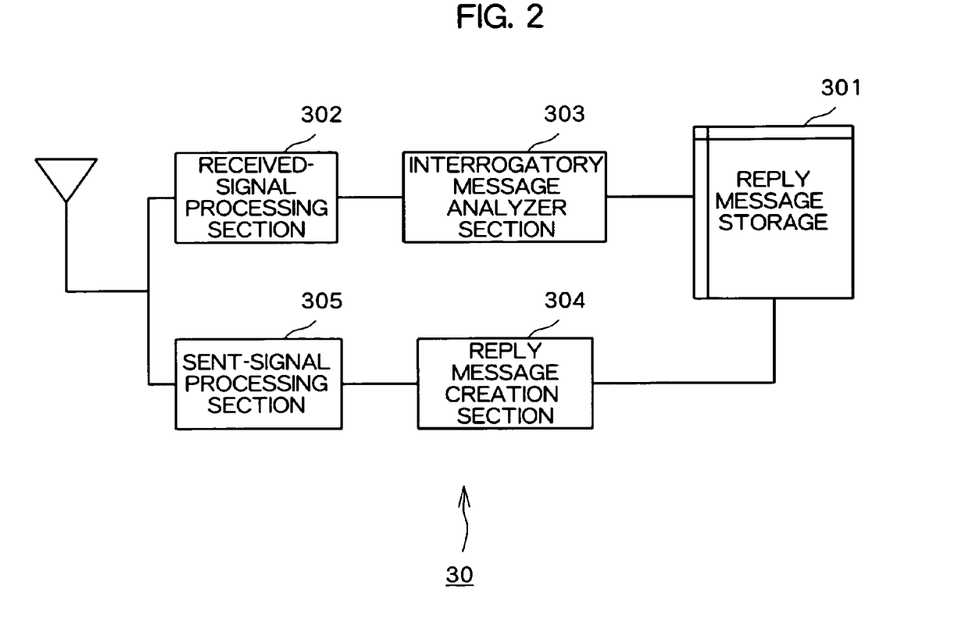
FIG. 2 is a functional block diagram of an RFID tag associated with an embodiment of the invention.

As shown in FIG. 2, the RFID tag 30 is designed including a reply message storage 301, a received-signal processing section 302, an interrogatory message analyzer section 303, a reply message creation section 304, and a sent-signal processing section 305. In the present description, an RFID tag 30 that exchanges signals with the interrogator wirelessly is used. Any type of IC tag may be used instead of the RFID tag 30 as long as it can transmit the reply message 202 to the interrogator in response to the interrogatory message 201 from the interrogator. In particular, the RFID tag may be of the electromagnetic induction type or RF type. Furthermore, the tag may be passive or active type. In addition, a tag using no RF waves such as a contact type IC tag may be used. The device is generally referred to as a tag and thus this terminology is used herein. The tag referred to herein is made to hang like a shipping tag. Alternatively, the tag may be stuck on or embedded.

The RFID tag 30 receives the interrogatory message 201 sent from the cell phone 10 and transmits back a reply message 202 in response to the interrogatory message 201. Thus, the tag 30 transmits the reply message 202 to the cell phone 10. In the present embodiment, the cell phone 10 is used as an interrogator in a relation with the RFID tag 30.

Figure 7:
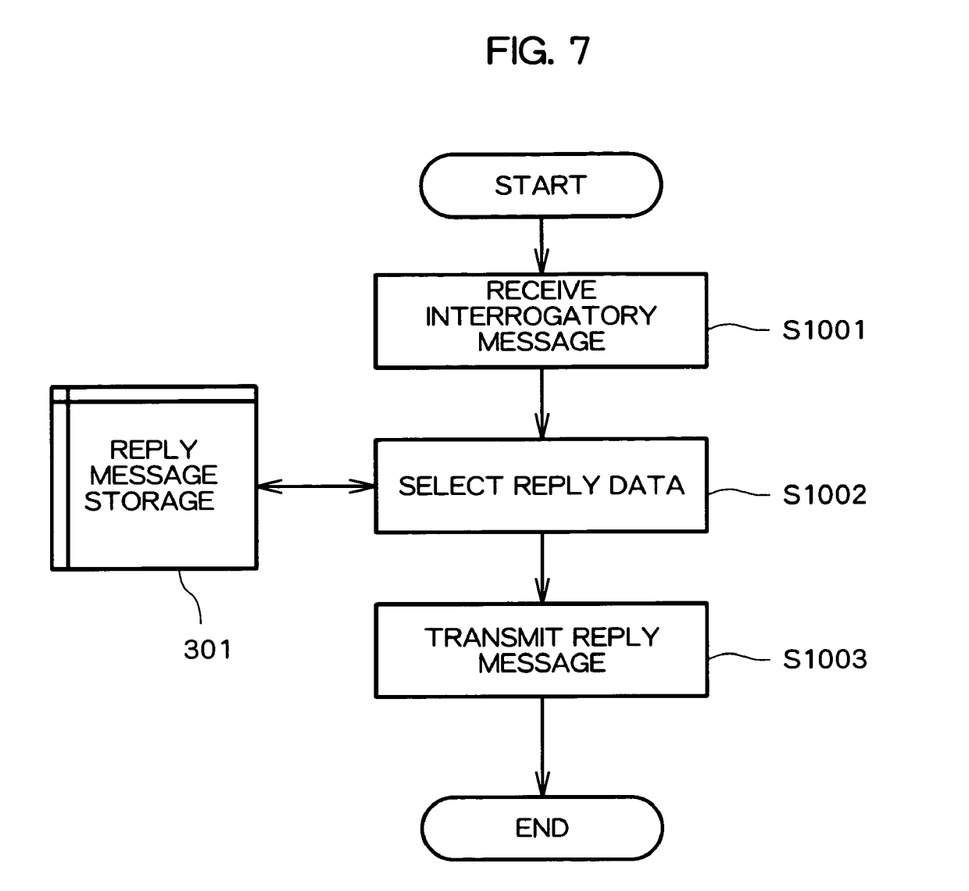
FIG. 7 is a flowchart illustrating processing associated with an embodiment of the invention.

Processing of the RFID tag 30 is described by referring also to FIG. 7. The RFID tag 30 receives the interrogatory message 201 sent from the cell phone 10 by its received-signal processing section 302, and outputs the message to the interrogatory message analyzer section 303 (S1001). The interrogatory message analyzer section 303 selects at least one data set (reply data) from plural reply messages 202 stored in the reply message storage 301 in response to identification information (e.g., information about a machine type code contained in a machine type code region 2021 (described later)) contained in the interrogatory message 201 (S1002). More specifically, the reply message storage 301 may be divided into plural regions. Different reply messages 202 corresponding to different sets of identification information may be stored in the different regions of the reply message storage 301. The interrogatory message analyzer section 303 may select at least one of the regions in response to the identification information, thus selecting a set of reply data.

The reply message creation section 304 reads out reply data selected by the interrogatory message analyzer section 303 and outputs the data to the sent-signal processing section 305. The sent-signal processing section 305 wirelessly transmits out the reply data as the reply message 202 from the antenna (S1003).

In this way, the RFID tag 30 can transmit at least one of the reply messages 202 stored in the tag itself in response to the interrogatory message 201 sent from the cell phone 10 acting as an interrogator.

The interrogatory message 201 and reply message 202 transmitted in the present embodiment are described in detail below.

Figure 3:
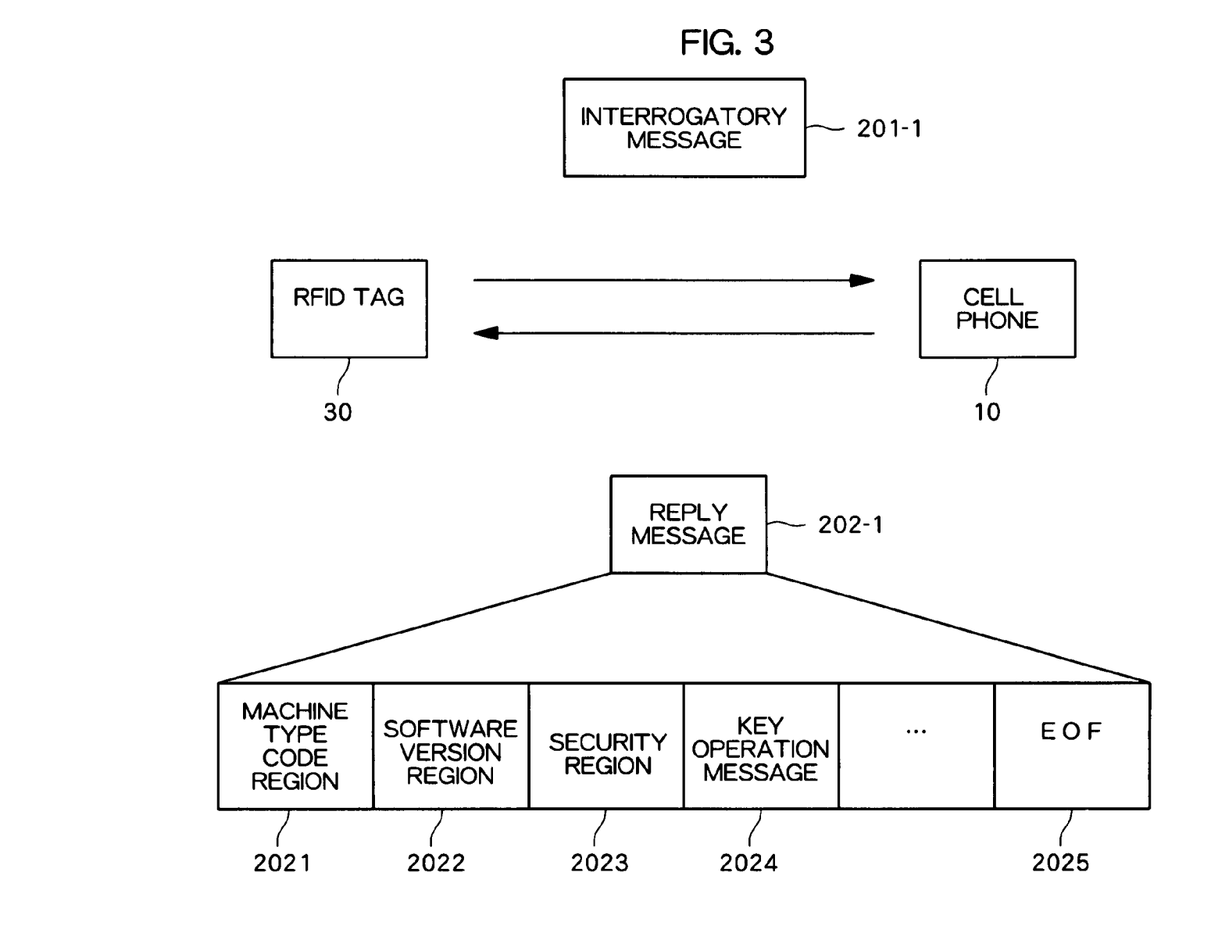
FIG. 3 is a diagram illustrating a message format associated with an embodiment of the invention.

In a first embodiment of the present invention, the reply message 202-1 is sent and received as a signal in the format as shown in FIG. 3. As shown in this figure, the reply message 202-1 includes a machine type code region 2021, a software version region 2022, a security region 2023, a key operation message 2024, and an EOF (End of File) 2025. The EOF is a signal indicating the end of a message.

Information contained in the machine type code region 2021 indicates the machine type of the cell phone. That is, various kinds of machines are sold as cell phones from various manufacturers, and this information is machine type code information for identifying the manufacturer and the machine type. Information contained in the software version region 2022 indicates the version of the software (firmware, application, or the like) installed in the cell phone. Information about a person who can utilize the reply message 202-1 including the security region 2023 is contained in the security region 2023. More specifically, information indicating who of a general cell phone user, maintenance user (such as a communications enterprise), and a debug user (such as a manufacturer) is contained. The key operation message 2024 will be described later.

The cell phone 10 receives the reply message 202-1 and makes a decision as to whether information contained in the machine type code region 2021 matches the information about the machine type of this cell phone 10. If a match is not found, the cell phone 10 may discard the reply message 202-1. Furthermore, the cell phone 10 makes a decision as to whether information contained in the software version region 2022 matches the software version information on this cell phone 10. If a match is not found, the cell phone 10 may discard the reply message 202-1. The phone may also inform the user of the phone 10 that the software version is different, promoting a version update. Additionally, the cell phone 10 makes a decision as to whether the information contained in the security region 2023 matches the security information set in this cell phone 10. If the information is not coincident, the cell phone 10 may discard the reply message 202-1. Furthermore, the cell phone 10 may request entry of a password depending on the information contained in the security region 2023.

The key operation message 2024 is next described. For this purpose, the arrangement of keys on the cell phone 10 is first described by referring to FIG. 4. As shown in the figure, the keypad 101 of the cell phone 10 has the aforementioned numerals from 0 to 9, #, and *, as well as some other keys. A code of four digits starting with 0x is assigned to each key as shown in the figure.

Figure 4:
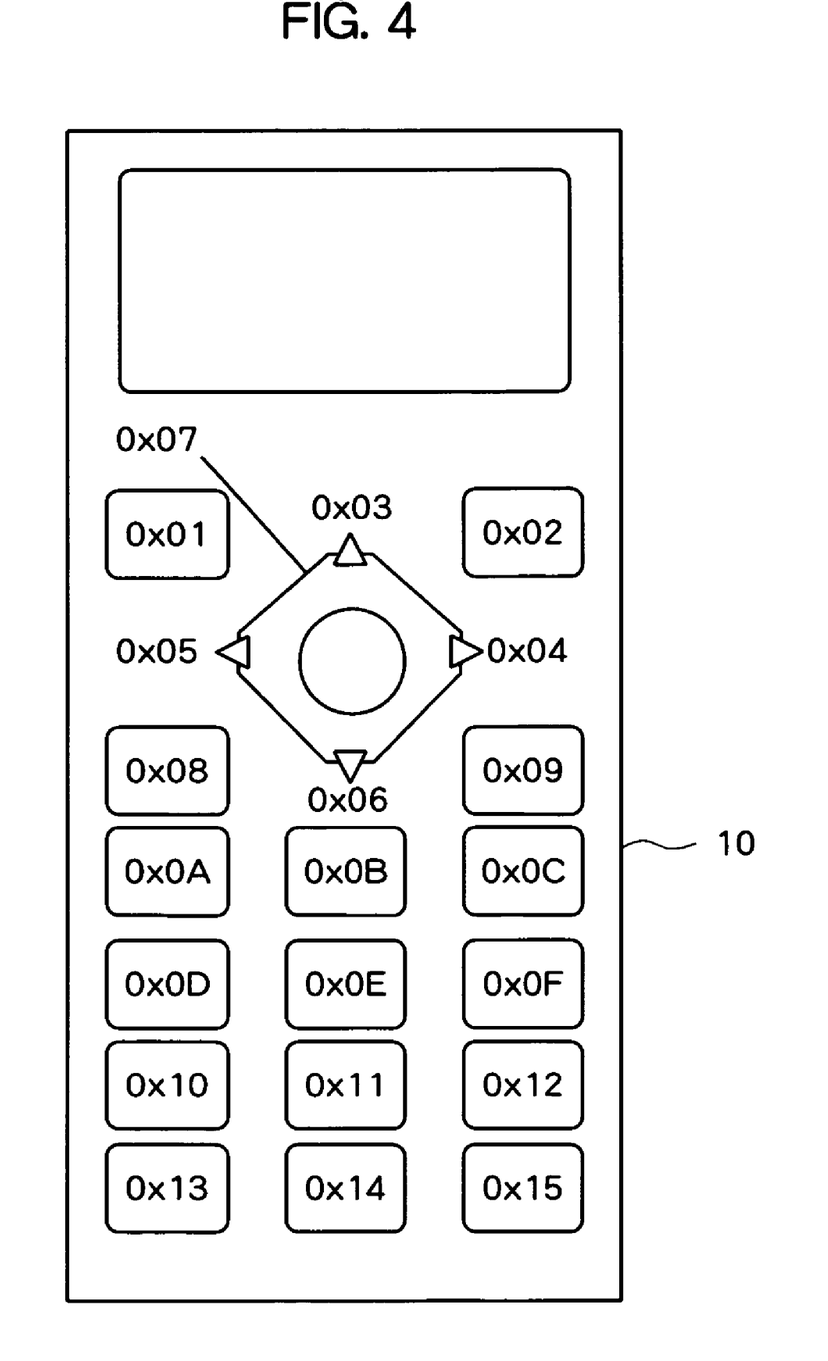
FIG. 4 is an explanatory view of key codes associated with an embodiment of the invention.

The reply message storage 301 stores information about operation of a key for each set of information, for example, about a machine type code. The user of the cell phone 10 performs a desired key entry to manipulate the cell phone 10 or other device. A set of key operation information is information about each such manipulation or operation and indicates entry of an ordered sequence of keys for carrying out the manipulation or operation. Specifically, in the key operation information, the codes are related to orders of key entry.

Figure 5:
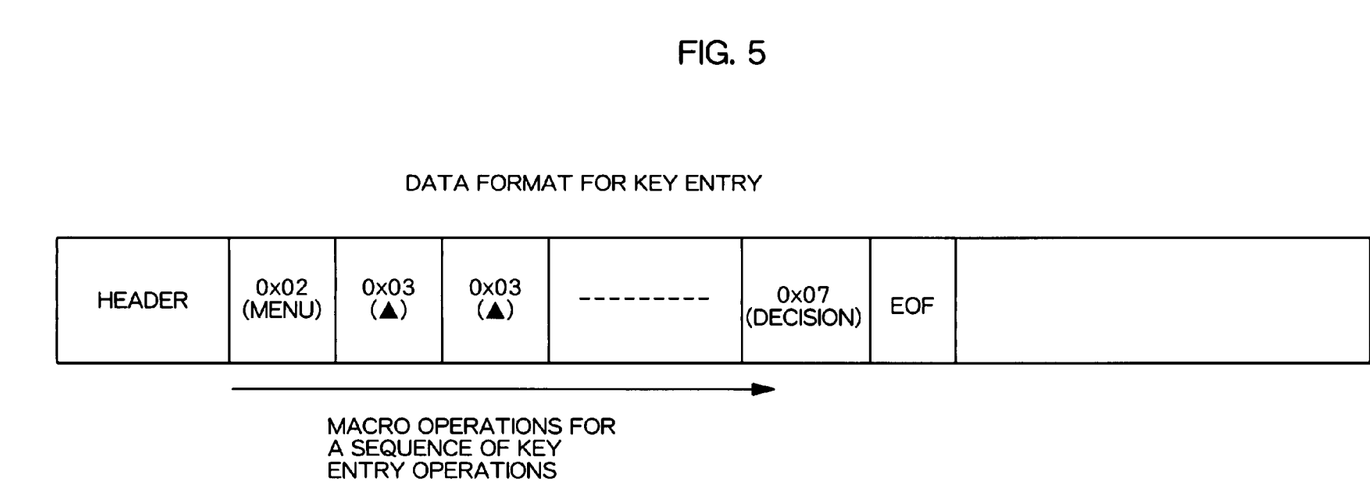
FIG. 5 is a diagram illustrating a message format associated with an embodiment of the invention.
Figure 6:
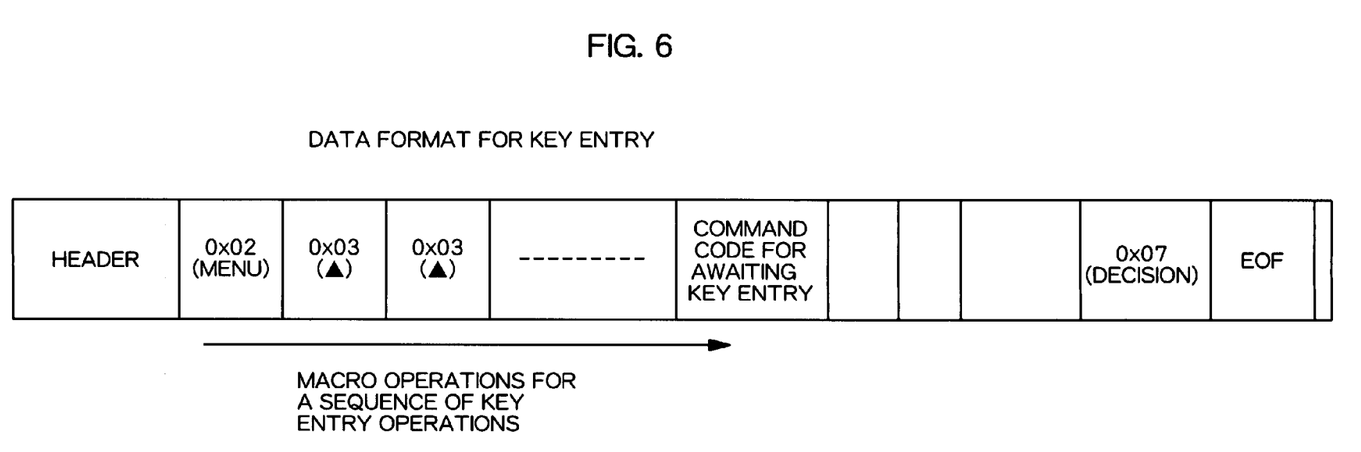
FIG. 6 is a diagram illustrating a message format associated with an embodiment of the invention.

As shown in FIG. 5 or 6, the reply message creation section 304 sets the key operation information regarding the key operation message 2024 of the reply message 202-1. FIGS. 5 and 6 show one example of the reply message 202-1. The header section is information including the machine type code region 2021, software version region 2022, and security region 2023. In FIG. 5, the content of the key entry indicated by the key operation message 2024 is key operation information "0x02", "0x03", "0x03", . . . , "0x07". The elements of the information are set in this order. The cell phone 10 receiving the key operation message 2024 carries out key entry according to the key operation information. In particular, the control section 112 emulates the keypad 101, thus carrying out key entry indicated by the key operation information.

In FIG. 6, the content of the key entry indicated by the key operation message 2024 is key operation information "0x02", "0x03", "0x03", . . . , "key entry waiting command code". The elements of the information are set in this order. The cell phone 10 receiving the key operation message 2024 carries out key entry according to the key operation information in the same way as in the case of FIG. 5. However, at the "key entry waiting command code", key entry is not emulated but the user's key entry is awaited.

Manipulation of keys on the cell phone 10 can be facilitated based on the key operation instruction information contained in the reply message 202-1 as described so far. That is, if the manipulation of keys is complex, key operation on the cell phone 10 can be automatically carried out by reading out information from the RFID tag 30. The cell phone 10 that has obtained the reply message 202-1 from the RFID tag 30 in this way transmits the reply message 202-1 or information created by the key operation carried out according to the reply message 202-1 as required to a server existing on a communication network (not shown) via the base station 20. In this way, information in response to the reply message 202-1 can be obtained from the server.

Figure 8:
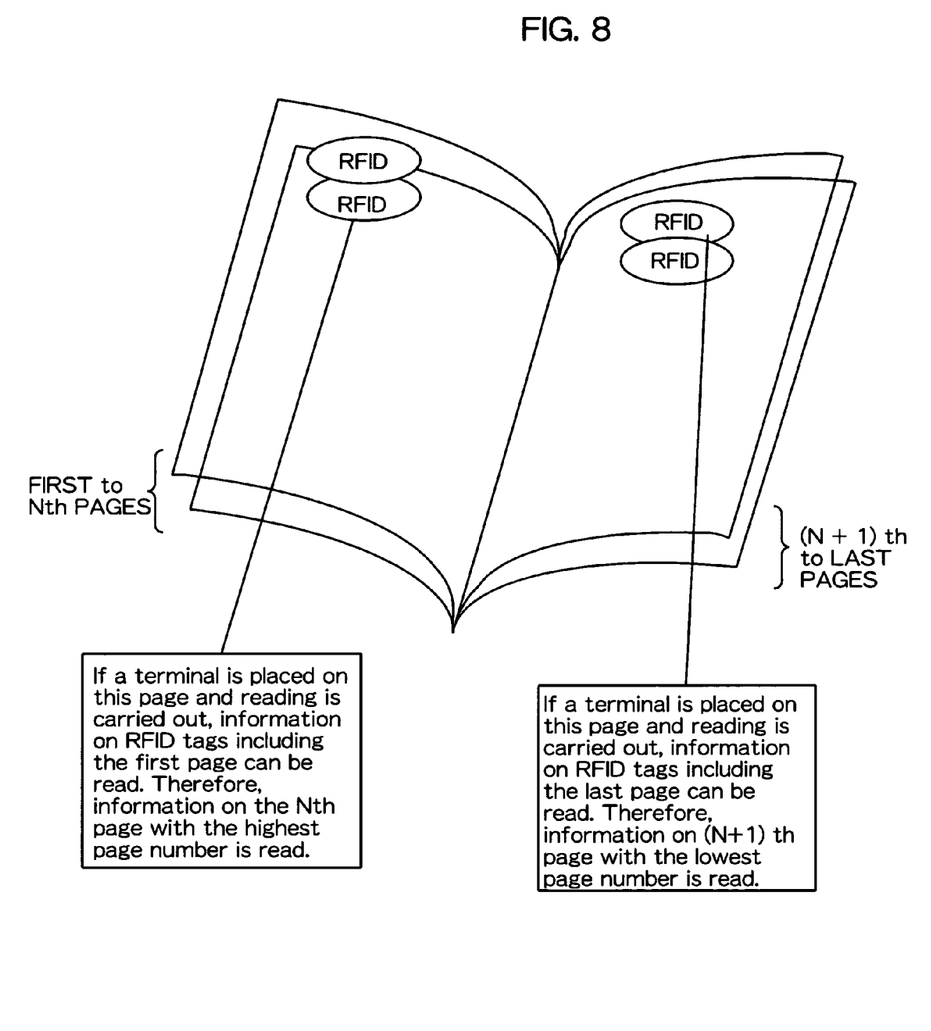
FIG. 8 is an explanatory view illustrating the manner in which RFID tags associated with an embodiment of the invention are attached.

As shown in FIG. 8, in a second embodiment of the invention, plural RFID tags 30 are attached to each page of a book 40. As a specific example of usage, the book 40 is a manual of the cell phone 10, and a method of manipulating the cell phone 10 is described on the pages. In this case, information about manipulation of keys indicated by the manipulation method is stored in the RFID tags 30 corresponding to each page.

Figure 9:
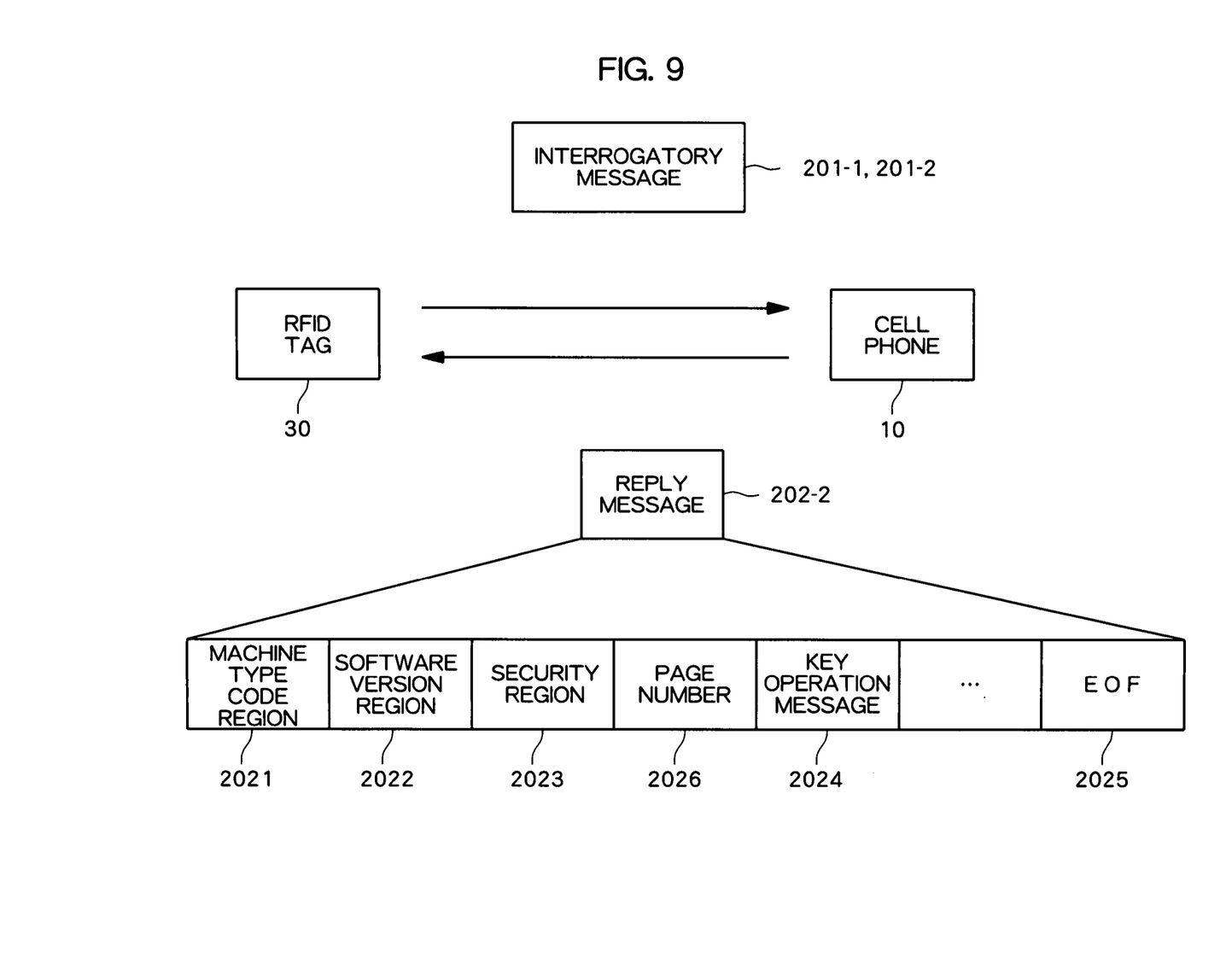
FIG. 9 is a diagram illustrating a message format associated with an embodiment of the invention.

In the present embodiment, the reply message 202-2 is sent and received as a signal having a format as shown in FIG. 9. As shown in the figure, the reply message 202-2 includes a machine type code region 2021, a software version region 2022, a security region 2023, a key operation message 2024, and an EOF 2025, as well as a page number 2026.

The machine type code region 2021, software version region 2022, security region 2023, and key operation message 2024 are substantially identical to their respective counterparts of the first embodiment. The page number 2026 is positional information indicating the page number (position) of the page of the book 40 to which the RFID tags 30 are attached. The information is stored in the reply message storage 301 and included in the reply message 202-2 by the reply message creation section 304.

When the cell phone 10 transmits the interrogatory message 201-1 to the book 40, the plural RFID tags 30 transmit the reply messages 202-2 one after another. Since the RFID tags 30 are attached to each page of the book, these RFID tags 30 are spaced apart from each other by a distance shorter than the distance by which RFID tags 30 are spaced apart from each other in an ordinary RFID system. Therefore, plural RFID tags 30 receive the interrogatory message 201-1. Processing of the cell phone 10 that receives the reply messages 202-2 sent one after another in this way is described next by referring to FIG. 10.

Figure 10:
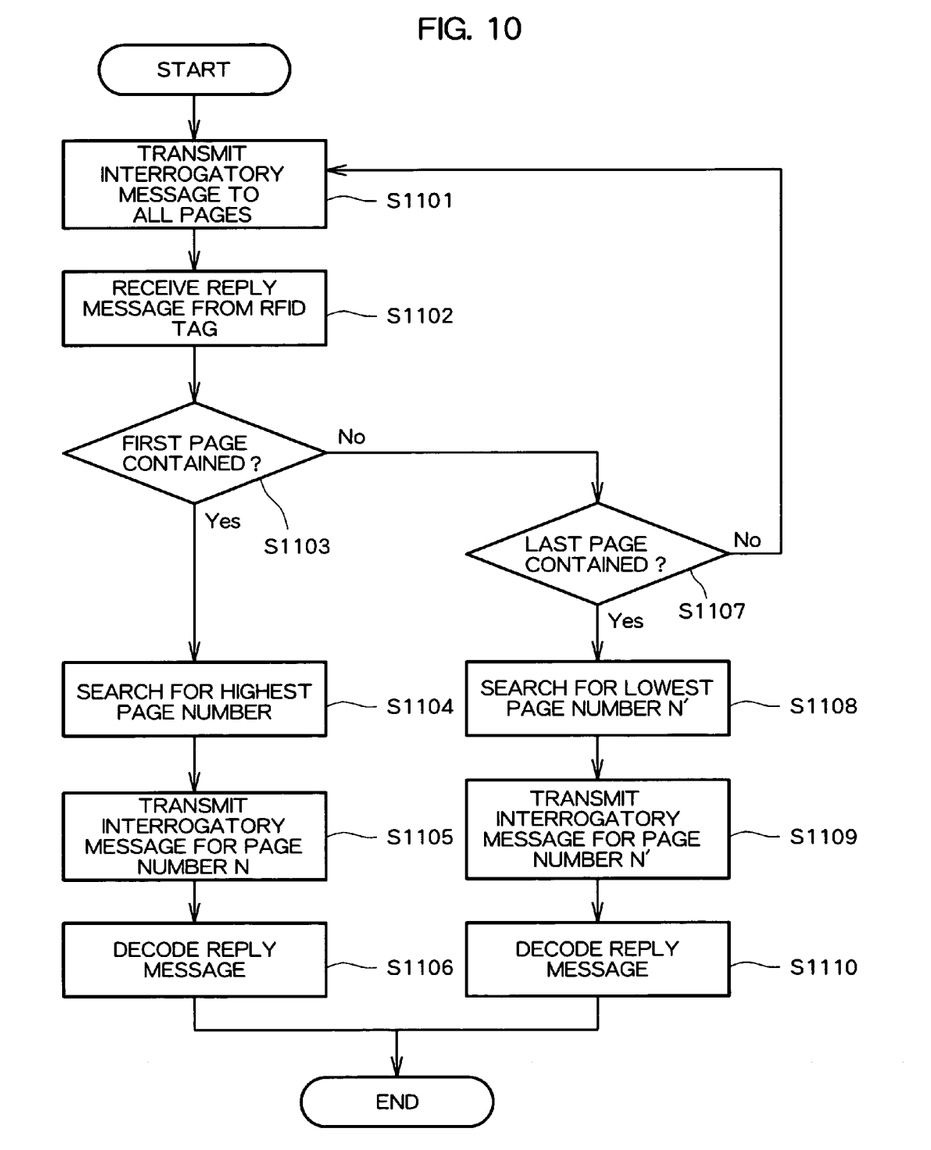
FIG. 10 is a flowchart illustrating processing associated with an embodiment of the invention.

First, the cell phone 10 transmits the interrogatory message 201-1 to all the RFID tags 30. At this time, only the RFID tags 30 attached to 1 or more pages included on one side of an opened book receive the interrogatory message 201-1 in practice, although the message has been sent to all the tags. For example, where page n and page (n+1) are spread apart, if the cell phone 10 is placed closer to the page n and transmits the interrogatory message 201-1, the RFID tags 30 attached to pages 1 to n receive the interrogatory message 201-1 (S1101). The cell phone 10 receives plural reply messages 202-2 each containing a page number and obtains the contained page numbers (S1102). The phone 10 makes a decision as to whether the page numbers include the first page (normally, page 1) (S1103). For this purpose, the page number 2026 may contain information indicating that it is the first page, in addition to the page number. If the decision is affirmative, the cell phone 10 detects the highest page number (N) of page numbers contained in the received reply message 202-2 (S1104), and transmits an interrogatory message 201-2 (specific interrogatory signal) only to the page with page number N (S1105). That is, the page number N is contained as positional information in the interrogatory message 201-2 and sent out. Then, the RFID tag 30 makes a decision as to whether the page number stored in itself matches the page number N contained in the interrogatory message 201-2. Only if the decision is affirmative, is the reply message 202-2 or 202-1 sent again. In this way, the cell phone 10 can receive only the reply message 202-1 or 202-2 from the RFID tags 30 attached to the page with the lowest page number out of the plural RFID tags 30. The content of the reply message (e.g., key operation information) can be obtained by decoding the received reply message (S1106).

The reply message 202-2 sent back by the RFID tags 30 when the interrogatory message 201-1 is received does not need to contain specific key operation information, because it will be sent again later. In consequence, the length of the reply message 202-2 sent back by the RFID tags 30 can be shortened.

On the other hand, if the decision at S1103 is that the first page (normally, page 1) is not contained, the cell phone 10 makes a decision as to whether the last page is contained or not (S1107). For this purpose, the page number 2026 may contain information indicating that it is the last page, in addition to the page number. If the decision is affirmative, the cell phone 10 detects the lowest (N') of the page numbers contained in the received reply message 202-2 (S1108) and transmits an interrogatory message 201-2 (specific interrogatory message) only to the page number N' (S1109). That is, the page number N' is contained in the interrogatory message 201-2 and sent. Each RFID tag 30 makes a decision as to whether the page number stored in itself matches the page number N' contained in the interrogatory message 201-2. Only if the decision is affirmative, is the reply message 202-2 or 202-1 sent. In this way, the cell phone 10 can receive only the reply message 202-1 or 202-2 from the RFID tag 30 attached to the page with the lowest page number. The content of the reply message, e.g., key operation information, can be obtained by decoding the received reply message (S110).

If the decision at step S1107 is that the last page is not contained, it is determined that the cell phone 10 could not precisely obtain the reply message 202-2 from the RFID tag 30 for some reason. The processing of step S1101 is again carried out.

In this way, the cell phone 10 can obtain only information stored in desired RFID tags 30 from the RFID tags 30 attached to the pages of the book 40. More specifically, the cell phone 10 can obtain only the information stored in the RFID tags 30 attached to the pages that are spread apart out of the pages of the book 40.

Where plural RFID tags 30 transmit the reply messages 202 one after another in response to the interrogatory message 201 sent to the book 40 from the cell phone 10 as described above, it is desired that the times at which the RFID tags 30 transmit be made different. That is, where the RFID tags 30 use the same frequency of radio waves, the transmission times of the RFID tags 30 are preferably made different to prevent interference among the radio waves sent from the RFID tags 30. A specific example of processing for this purpose is described by referring to FIG. 11.

Figure 11:
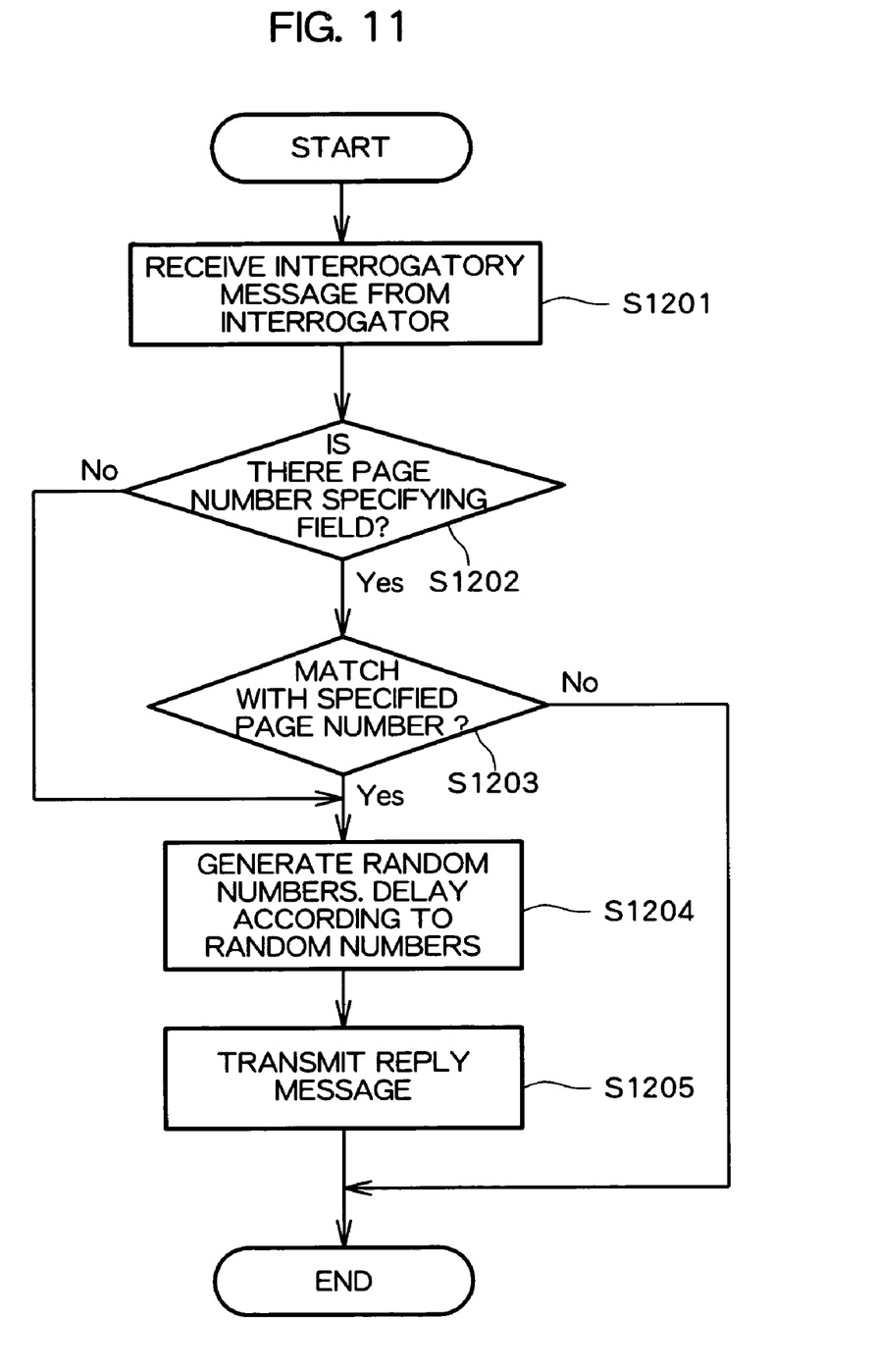
FIG. 11 is a flowchart illustrating processing associated with an embodiment of the invention.

FIG. 11 is a flowchart of processing performed when each RFID tag 30 transmits back the reply message 202 in response to the interrogatory message 201 received from the cell phone 10 that is an interrogator. As shown in the figure, the RFID tag 30 first receives the interrogatory message 201 from the interrogator (S1201) The tag 30 makes a decision as to whether the interrogatory message 201 has a page number 2026 field (S1202). That is, the tag makes a decision as to whether the interrogatory message 201 is a specific interrogatory message. If the decision is negative, the RFID tag 30 proceeds to processing of S1204 (described later). If the decision is affirmative (i.e., there is the page number 2026 field), the RFID tag 30 makes a decision as to whether a match with the page number stored in its own reply message storage 301 is found (S1203). If no match is found, the RFID tag 30 does not perform the subsequent processing. If a match is found, the RFID tag 30 produces random numbers and delays the transmission timing of the reply message 202 according to the random numbers (S1204). That is, the RFID tag 30 determines the transmission time of the reply message 202 according to the random numbers. Preferably, each of the random numbers consists of a sufficient number of digits such that the RFID tags 30 corresponding to plural page numbers generate different sets of random numbers. The RFID tag 30 transmits the reply message 202 at the determined transmission time. In this way, RF waves sent from the RFID tags 30 can be prevented from interfering with each other.

Finally, the information processing system associated with the present invention is again described summarily. The information processing system associated with the invention has plural IC tags and at least one interrogator. The interrogator has an interrogatory signal transmitter for transmitting an interrogatory signal to the IC tags to read information from each of the IC tags, and a specific interrogatory signal transmitter for transmitting a specific interrogatory signal in response to each set of positional information transmitted respectively from each IC tags, the specific interrogatory signal containing at least one of the sets of positional information. Each of the IC tags has a positional information storage for storing positional information about a position at which the IC tag is attached, a positional information transmitter for transmitting the positional information stored in the positional information storage to the interrogator in response to the interrogatory signal sent from the interrogator, a decision section for making a decision as to whether the positional information contained in the specific interrogatory signal matches the positional information stored in the positional information storage, an information storage for storing plural sets of information in plural storage regions, respectively, a region selecter for selecting at least one of the storage regions according to the specific interrogatory signal sent from the interrogator, and an information transfer section for transmitting information contained in the storage region selected by the region selecter to the interrogator in a case where a decision made by the decision section indicates a match.

In this way, each IC tag can transmit back a signal in response to an interrogatory signal sent from the interrogator. Furthermore, it can determine whether information is transmitted to the interrogator according to the positional information regarding the position at which the IC tag is attached. In addition, the IC tag can transmit the information only when positional information contained in the interrogatory signal sent from the interrogator is coincident with the stored positional information. The transmission of the information is performed by transmitting and reception of RF signals, for example, in a case where the IC tag has an RF transmiter section. Where the tag uses electromagnetic induction, The transmission of the information is performed by modulating an electromagnetic field produced by electromagnetic induction caused by electromagnetic waves sent from the interrogator, according to the information stored in the IC tag.

Furthermore, in the above-described information processing system, the specific interrogatory signal sent from the interrogator contains given identification information. The information storage may store the information of each set of given identification information in their respective storage regions. The region selecter may select one of the storage regions corresponding to the identification information contained in the specific interrogatory signal sent from the interrogator. In this way, the IC tag can select the storage region corresponding to the given identification information according to the given identification information contained in the interrogatory signal sent from the interrogator and transmit the information stored in the region.

Additionally, in the information processing system, each of the IC tags may further include a random number generating section for generating random numbers. The positional information transmitter may determine the transmission time of the positional information according to the random numbers. In this way, the transmission time of positional information may be different among IC tags.

An interrogator associated with the present invention includes a specific interrogatory signal transmitter for transmitting a specific interrogatory signal including at least one set of positional information of plural sets of positional information respectively transmitted from plural IC tags attached to a given page of a book according to the positional information indicating the given page and contained in the transmitted information. Where the sets of positional information respectively transmitted from the IC tags contain positional information indicating that the page is the first page of the book, the specific interrogatory signal transmitter transmits the specific interrogatory signal including positional information indicating the highest page number out of page numbers indicated by the transmitted sets of positional information. Where the sets of positional information respectively transmitted from the IC tags contain positional information indicating that the page is the last page of the book, the signal transmitter transmits the specific interrogatory signal containing positional information indicating the lowest page number of the page numbers indicated by the transmitted sets of positional information.

In this way, the interrogator can transmit the specific interrogatory signal only to the desired IC tag out of the IC tags attached to each page of the book.

The interrogator may further include a key entry acceptance section for accepting entry of plural keys, a key code assignment section for assigning key codes to the keys, respectively, and a key entry control section included in the key entry acceptance section. Where information transmitted from the IC tag contains key operation information containing the key codes, the key entry control section performs key entry according to the key codes contained in the key operation information. In this way, the interrogator can be made to perform key entry according to the key operation information sent from the IC tag.

A method of reading IC tags in accordance with the present invention is implemented in an information processing system including plural IC tags and at least one interrogator. The method is implemented by the interrogator and comprises the steps of: transmitting an interrogatory signal to each of the IC tags to read information from each IC tag; and transmitting a specific interrogatory signal in response to each set of positional information transmitted respectively from each IC tags, the specific interrogatory signal contains at least one of the sets of positional information. Each of the IC tags performs a method comprising the steps of: transmitting positional information about a position at which this IC tag is attached to the interrogator according to the interrogatory signal sent from the interrogator; making a decision as to whether the positional information contained in the specific interrogatory signal matches the above-described positional information about a position at which this IC tag is attached; selecting at least one of storage regions according to the specific interrogatory signal sent from the interrogator; and transmitting the information stored in the storage region selected in the step of selecting at least one storage region to the interrogator in a case where the decision indicates a match.

While there have been described what are at present considered to be preferred embodiments of the invention, it will be understood that various modifications may be made thereto, and it is intended that the appended claims cover all such modifications as fall within the true spirit and scope of the invention.

Further, the disclosure of Japanese Patent Application No. 2004-311292 filed on Oct. 26, 2004, including specification, claims, drawings, and abstract is incorporated herein by reference in its entirety.

What is claimed is:

1. An interrogator having a specific interrogatory signal transmitter for transmitting a specific interrogatory signal including at least one set of positional information of plural sets of positional information contained in sets of information respectively transmitted from plural IC tags attached to a given page of a book according to positional information which indicates the given page and which is contained in said transmitted information, wherein when said sets of positional information respectively transmitted from the IC tags given positional information indicating that the page is the first page of the book, said specific interrogatory signal transmitter transmits the specific interrogatory signal including positional information indicating a highest page number out of page numbers indicated by the transmitted sets of positional information, and wherein when said sets of positional information respectively transmitted from the IC tags contain positional information indicating that the page is the last page of the book, the signal transmitter transmits the specific interrogatory signal containing positional information indicating a lowest page number of the page numbers indicated by the transmitted sets of positional information.

2. An interrogator as set forth in claim 1, further including:

a key entry acceptance section for accepting entry of plural keys;

a key code assignment section for assigning key codes to the keys, respectively; and a key entry control section included in said key entry acceptance section;

wherein when information transmitted from said IC tags contains key operation information containing said key codes, the key entry control section performs key entry according to the key codes contained in the key operation information.

* * * * *